United States Patent

Wu et al.

[11] Patent Number: 6,051,520
[45] Date of Patent: Apr. 18, 2000

[54] HYDROTREATING CATALYST COMPOSITION AND PROCESSES THEREFOR AND THEREWITH

[75] Inventors: An-hsiang Wu, Bartlesville; Charles A. Drake, Nowata, both of Okla.

[73] Assignee: Phillips Petroleum Company, Bartlesville, Okla.

[21] Appl. No.: 09/081,110

[22] Filed: May 19, 1998

[51] Int. Cl.[7] .............................. B01J 29/04; B01J 29/06; B01J 21/00

[52] U.S. Cl. .............................. 502/60; 502/64; 502/71; 502/74

[58] Field of Search .............................. 502/60, 64, 74, 502/71

[56] References Cited

U.S. PATENT DOCUMENTS

| | | | |
|---|---|---|---|
| 2,846,363 | 8/1958 | Folkins et al. | 196/50 |
| 2,971,904 | 2/1961 | Gladrow et al. | 208/135 |
| 3,200,063 | 8/1965 | Wilson | 208/111 |
| 3,549,518 | 12/1970 | Mason et al. | 208/111 |
| 3,617,486 | 11/1971 | Lewis et al. | 208/59 |
| 3,617,517 | 11/1971 | Rashkin | 208/136 |
| 3,627,674 | 12/1971 | Nagl | 208/216 |
| 3,843,741 | 10/1974 | Jan | 260/673.5 |
| 4,219,445 | 8/1980 | Finch | 252/443 |
| 4,231,899 | 11/1980 | Chen et al. | 252/455 Z |
| 4,276,438 | 6/1981 | Chu | 585/467 |
| 4,325,843 | 4/1982 | Slaugh et al. | 252/443 |
| 4,515,763 | 5/1985 | Boudart et al. | 423/409 |
| 4,532,226 | 7/1985 | Chu | 502/71 |
| 4,845,063 | 7/1989 | Chu | 502/60 |
| 4,849,386 | 7/1989 | Wang et al. | 502/62 |
| 5,143,596 | 9/1992 | Maxwell et al. | 208/89 |
| 5,330,944 | 7/1994 | Sherif et al. | 502/64 |
| 5,409,596 | 4/1995 | Fletcher et al. | 208/89 |
| 5,411,658 | 5/1995 | Chawla et al. | 208/89 |
| 5,500,108 | 3/1996 | Durand et al. | 208/89 |
| 5,541,146 | 7/1996 | Chang et al. | 502/64 |
| 5,574,199 | 11/1996 | Beck et al. | 585/407 |
| 5,610,112 | 3/1997 | Lago et al. | 502/63 |
| 5,612,274 | 3/1997 | Wu et al. | 502/325 |
| 5,643,441 | 7/1997 | Timken et al. | 208/89 |
| 5,776,852 | 7/1998 | Wu et al. | 502/177 |
| 5,789,642 | 8/1998 | Wu et al. | 585/489 |
| 5,804,059 | 9/1998 | Wu et al. | 208/135 |
| 5,807,799 | 9/1998 | Drake et al. | 502/67 |
| 5,817,903 | 10/1998 | Wu et al. | 585/486 |
| 5,856,608 | 1/1999 | Wu et al. | 585/466 |
| 5,866,744 | 2/1999 | Wu et al. | 585/486 |
| 5,877,369 | 3/1999 | Wu et al. | 585/419 |
| 5,883,033 | 3/1999 | Drake et al. | 502/68 |
| 5,883,034 | 3/1999 | Drake et al. | 502/68 |

*Primary Examiner*—Steven P. Griffin
*Assistant Examiner*—Cam N. Nguyen
*Attorney, Agent, or Firm*—Richmond, Hitchcock, Fish & Dollar

[57] ABSTRACT

A catalyst composition, a process for producing the composition and a hydrotreating conversion process are disclosed. The composition comprises a zeolite having incorporated therein a promoter comprising a metal carbide or a metal nitride. The composition can be produced by incorporating a metal compound into the zeolite followed by thermal treatment of the resulting zeolite with a hydrocarbon, preferably in the presence of hydrogen, or with ammonia. The hydrotreating process comprises contacting a hydrocarbon-containing fluid with the catalyst composition under a condition sufficient to effect the reduction of sulfur content in the hydrocarbon-containing fluid.

13 Claims, No Drawings

HYDROTREATING CATALYST
COMPOSITION AND PROCESSES
THEREFOR AND THEREWITH

Accordingly, there is an ever-increasing need to develop a catalyst and a single process to simultaneously reduce sulfur content and to retain or even increase the octane number of a hydrocarbon. Such development would also be a significant contribution to the art and to the economy.

SUMMARY OF THE INVENTION

An object of this invention is to provide a catalyst composition which can be used in a hydrocarbon upgrading or hydrotreating process. Also an object of this invention is to provide a process for producing the catalyst composition. Another object of this invention is to provide a process which can employ the catalyst composition in a hydrotreating process. An advantage of the catalyst composition is that it can in a single process simultaneously reduce the sulfur content in a hydrocarbon and substantially retain the octane number of the hydrocarbon. Other objects and advantages will become more apparent as the invention is more fully disclosed hereinbelow.

According to a first embodiment of the present invention, a composition which can be used as a catalyst in hydrotreating process for upgrading a hydrocarbon is provided. The composition can comprise a zeolite having incorporated therein a promoter comprising a metal carbide or a metal nitride.

According to a second embodiment of the invention, a process for producing a composition which can be used as catalyst in a hydrocarbon upgrading or a hydrotreating process is provided. The process can comprise (1) optionally calcining a zeolite to produce a calcined zeolite; (2) contacting a zeolite or a calcined zeolite with a transition metal compound of Groups I to VIII of the CAS version of the Periodic Table of the Elements (CRC Handbook of Chemistry and Physics, 74th edition, 1993–1994, CRC Press, Boca Raton, Fla.) under a condition sufficient to incorporate the metal compound into the zeolite to form a modified zeolite; (3) calcining the modified zeolite to produce a calcined modified zeolite; and (4) contacting the modified zeolite with a hydrocarbon under a condition sufficient to convert the modified zeolite into a carbon-modified zeolite. For the production of a nitrogen-modified zeolite, i.e., a zeolite incorporated with a metal nitride, ammonia is used to replace hydrocarbon in step (4).

According to a third embodiment of the present invention, a process which can be used in a hydrocarbon upgrading process (hereinafter referred to as hydrotreating process) is provided which comprises, consists essentially of, or consists of, contacting a fluid which comprises at least one saturated hydrocarbon, optionally in the presence of an inert fluid such as a hydrogen-containing fluid, with a catalyst composition, which can be the same as disclosed above in the first embodiment of the invention, under a condition effective to reduce the sulfur content in the hydrocarbon and to substantially retain the octane number of the hydrocarbon.

DETAILED DESCRIPTION OF THE
INVENTION

According to the first embodiment of the invention, a composition which can be used as catalyst in a hydrotreating process is provided. The composition comprises, consists essentially of, or consists of, a zeolite having incorporated therein, a promoter which comprises, or consists essentially of, carbon and either a metal carbide or a metal nitride wherein the metal of the metal carbide or nitride is selected from the Groups I–VIII (the transitional metals) of the Periodic Table of the Elements such as, for example, La, Ti, Cr, Mn, Fe, Co, Ni, Mo, Pd, Rh, Ru, Zr, Hf, W, Re, Ir, Pt, Zn, Ag, Cu, Ce, V, Nb, and combinations of two or more thereof wherein the promoter is present in the composition in sulfur-reducing amount to reduce the sulfur content in the hydrocarbon, when the composition is used in a hydrotreating process.

As used herein, the term "hydrocarbon" is generally referred to, unless otherwise indicated, as one or more hydrocarbons, saturated or unsaturated, having 1 to about 50, preferably about 2 to about 40, more preferably about 2 to about 30, and most preferably 2 to 20 carbon atoms per molecule. Also preferably a hydrocarbon is a saturated hydrocarbon, a mixture of saturated hydrocarbons, or a mixture of saturated hydrocarbons and unsaturated hydrocarbons. Examples of such hydrocarbons include, but are not limited to, ethane, propanes, butanes, pentanes, hexanes, gasolines, naphthas, fuel oils, and combinations of two or more thereof.

According to the first embodiment of the invention, the weight ratio of the promoter to the zeolite can be any ratio so long as the ratio can effect the reduction of sulfur content in the hydrocarbon in a hydrotreating process. Generally, the ratio can be in the range of from about 0.0001:1 to about 1:1, preferably about 0.0005:1 to about 1:1, more preferably about 0.001:1 to about 0.9:1 and most preferably from 0.005:1 to 0.75:1 for an effective reduction of sulfur content. Alternatively, the promoter can be present in the catalyst composition in the range of from about 0.01 to about 50, preferably about 0.05 to about 50, more preferably about 0.1 to about 45, and most preferably 0.5 to 40 grams per 100 grams of the catalyst composition.

The weight ratio of carbon or nitrogen to the metal of metal carbide or metal nitride can be in the range of about 0.01:1 to about 50:1, preferably about 0.05:1 to about 30:1, more preferably about 0.1:1 to about 20:1, and most preferably 0.1:1 to 10:1. The presently preferred composition is a ZSM-5 zeolite having incorporated therein a metal carbide wherein the metal is selected from the group consisting of molybdenum, zinc, copper, tungsten, platinum, silver, and combinations of two or more thereof.

According to the present invention, any promoter that, as compared to use of a zeolite only, can effect the reduction of sulfur content, nitrogen content, or both and substantially retain the octane number of a hydrocarbon in a hydrotreating process can be employed. Presently it is preferred that the metal of the promoter is a transition metal. Examples of suitable metals can be selected from Groups I–VIII such as the group consisting of molybdenum, manganese, iron, chromium, hafnium, ruthenium, tungsten, cobalt, rhenium, rhodium, iridium, nickel, palladium, platinum, silver, copper, zinc, lanthanum, and combinations of two or more thereof. The metal can be in any available oxidation state. For example, molybdenum can have an oxidation state of 2, 3, 4, 5, and 6.

The composition can also be characterized by having the following physical characteristics: a micropore surface area, as determined by the BET method using nitrogen, in the range of from about 50 to about 1,000, preferably 50 to 500 $m^2/g$; a micropore pore volume in the range of from about 0.1 to about 2.0, preferably about 0.1 to about 1.0 ml/g; an average micropore pore diameter in the range of from about 0.1 to about 500, preferably about 1 to about 200 Å; and a porosity of more than about 20%.

Any commercially available zeolites can be employed in the invention. Examples of suitable zeolites include, but are not limited to, those disclosed in Kirk-Othmer Encyclopedia of Chemical Technology, third edition, volume 15 (John Wiley & Sons, New York, 1991). The presently preferred zeolite is a ZSM-5 zeolite.

Any methods known to one skilled in the art for incorporating a compound or a portion thereof into a zeolite such as, for example, impregnation, ion exchange, stirring, extrusion, or any physical mixing, can be employed for producing the composition of the present invention. However, it is presently preferred the composition be produced by the process disclosed in the second embodiment of the invention.

According to the second embodiment of the invention, a zeolite, preferably a ZSM-5 zeolite, can be optionally contacted with one or more suitable binders in a liquid, preferably aqueous medium, to form a zeolite-binder mixture. Any binders known to one skilled in the art for use with a zeolite are suitable for use herein. Examples of suitable binder include, but are not limited to, clays such as for example, kaolinite, halloysite, vermiculite, chlorite, attapulgite, smectite, montmorillonite, illite, saconite, sepiolite, palygorskite, and combinations of two or more thereof; diatomaceous earth; aluminas such as for example $\alpha$-alumina and $\gamma$-alumina; silicas; alumina-silica; aluminum phosphate; aluminum chlorohydrate; and combinations of two or more thereof. Because these binders are well known to one skilled in the art, description of which is omitted herein. The weight ratio of a zeolite to a binder can be in a wide range and generally in the range of from about 200:1 to about 0.01:1, preferably 100:1 to 0.1:1.

The zeolite and the binder can be well mixed by any means known to one skilled in the art such as stirring, blending, kneading, or extrusion, following which the zeolite-binder mixture can be dried in air at a temperature in the range of from about 20 to about 200° C., preferably about 25 to about 175° C., and most preferably 25 to 150° C. for about 0.5 to about 50 hours, preferably about 1 to about 30 hours, and most preferably 1 to 20 hours, preferably under atmospheric pressure. Thereafter, the dried, zeolite-binder mixture can be further calcined, if desired, in air at a temperature in the range of from about 300 to 1000° C., preferably about 350 to about 750° C., and most preferably 450 to 650° C. for about 1 to about 30 hours to prepare a calcined zeolite-binder. If a binder is not desired, a zeolite can also be calcined under similar conditions to remove any contaminants, if present.

A zeolite, a calcined zeolite, or a calcined zeolite-binder can be treated with a compound containing an exchangeable ammonium ion to prepare an ammonium-exchanged zeolite. Whether a zeolite is calcined or contains a binder, the process or treatment in the second embodiment is the same for each. For the interest of brevity, only a zeolite is described hereinbelow. Examples of suitable ammonium-containing compounds include, but are not limited to, ammonium sulfate, ammonium chloride, ammonium nitrate, ammonium bromide, ammonium fluoride, and combinations of any two or more thereof. Treatment of the zeolite replaces the original ions such as, for example, alkali or alkaline earth metal ions of the zeolite with predominantly ammonium ions. Techniques for such treatment are well known to one skilled in the art such as, for example, ion exchange with the original ions. For example, a zeolite can be contacted with a solution containing a salt of the desired replacing ion or ions.

Generally, a zeolite can be suspended in an aqueous solution of an ammonium-containing compound. The concentration of the zeolite in the aqueous solution can be in the range of from about 0.01 to about 200, preferably about 0.1 to about 150, more preferably about 1 to about 100, and most preferably 5 to 75 grams per liter. The amount of the ammonium-containing compound required depends on the amount of the original ion(s) to be exchanged. Upon the preparation of the solution, the solution can be subject to a temperature in the range of from about 30° C. to about 200° C., preferably about 40° C. to about 150° C., and most preferably 50° C. to 125° C. for about 1 to about 100 hours, preferably about 1 to about 50 hours, and most preferably 2 to 25 hours depending on desired degrees of ion exchange. The treatment can be carried out under a pressure in the range of from about 1 to about 10 atmospheres (atm), preferably about 1 atm or any pressure that can maintain the required temperature. Thereafter, the treated zeolite can be washed with running water for 1 to about 60 minutes followed by drying and calcining to produce calcined zeolite. The drying and calcining processes can be carried out substantially the same as those disclosed above for the preparation of a calcined zeolite or zeolite-binder.

Generally, the ammonium-exchanged zeolite becomes hydrogen exchanged upon calcination or high temperature treatment such that a predominant proportion of its exchangeable cations are hydrogen ions. The above-described ion exchanges of exchangeable ions in a zeolite is well known to one skilled in the art. See, for example, U.S. Pat. No. 5,516,956, disclosure of which is incorporated herein by reference. Because the ion exchange procedure is well known, the description of which is omitted herein for the interest of brevity.

A zeolite is generally first treated with a metal compound (a promoter precursor). According to the second embodiment of the present invention, any metal compound, preferably a transition metal compound, which can be converted to its metal carbide or metal nitride, as disclosed in the first embodiment of the invention, that, as compared to use of a zeolite only, can effect the retention of substantial octane number of the hydrocarbon and substantial reduction of the sulfur content, nitrogen content, or both in a hydrocarbon during a hydrotreating process of the hydrocarbon can be employed. Presently it is preferred that a metal compound be selected from the group consisting of molybdenum compounds, lanthanum compounds, tungsten compounds, chromium compounds, iron compounds, ruthenium compounds, manganese compounds, rhenium compounds, cobalt compounds, rhodium compounds, iridium compounds, nickel compounds, palladium compounds, platinum compounds, hafnium compound, silver compounds, copper compounds, zinc compounds, and combinations of two or more thereof. The presently preferred metal compound is selected from molybdenum compounds, silver compounds, copper compounds, zinc compounds, tungsten compounds, and combinations of two or more thereof.

Generally, any molybdenum containing compounds which, when incorporated into a zeolite, are effective to enhance the conversion of a $C_9+$ aromatic compound can be used in the present invention. Suitable molybdenum-containing compounds include, but are not limited to, molybdenum chloride, molybdenum acetate, molybdenum fluoride, molybdenum hexacarbonyl, molybdenum sulfide, sodium molybdates, potassium molybdates, molybdenum oxychloride, molybdenum sulfide, ammonium tetrathiomolybdate, ammonium molybdate, ammonium dimolybdate, ammonium heptamolybdate, molybdenum oxides in which the oxidation state of Mo can be 2, 3, 4, 5, and 6, and combinations of two or more thereof.

Examples of suitable tungsten compounds include, but are not limited to, ammonium tungstate, tungsten chloride, tungsten oxide, tungstic acid, and combinations of two or more thereof.

Examples of suitable zinc compounds include, but are not limited to, zinc formate, zinc acetate, zinc bromide, zinc chloride, zinc fluoride, zinc nitrate, zinc sulfate, zinc molybdate, and combinations of two or more thereof.

Similarly, examples of silver compounds include, but are not limited to, silver nitrate, silver acetate, silver bromide, silver chloride, silver sulfate, silver sulfide, and combinations of two or more thereof.

Examples of suitable titanium compounds include, but are not limited to, titanium zinc titanate, lanthanum titanate, titanium tetramides, titanium tetramercaptides, titanium tetrabutoxide, titanium tetramethoxides, titanium tetraethoxide, titanium tetrapropoxide, titanium tetrachloride, titanium trichloride, titanium bromides, and combinations of two or more thereof.

Similarly, examples of suitable zirconium compounds include, but are not limited to, zirconium acetate, zirconium formate, zirconium chloride, zirconium bromide, zirconium butoxide, zirconium tert-butoxide, zirconium chloride, zirconium citrate, zirconium ethoxide, zirconium methoxide, zirconium propoxide, and combinations of two or more thereof.

Examples of suitable copper compounds include, but are not limited to, copper nitrate, copper chloride, copper bromide, copper ethoxide, copper fluoride, copper iodide, and combinations of two or more thereof.

Examples of suitable lanthanum compounds include, but are not limited to, lanthanum acetate, lanthanum carbonate, lanthanum octanoate, lanthanum fluoride, lanthanum chloride, lanthanum bromide, lanthanum iodide, lanthanum nitrate, lanthanum perchlorate, lanthanum sulfate, tanthanum titanate, and combinations of two or more thereof.

Examples of the other metal compounds are well known to one skilled in the art, the description of which is omitted herein for the interest of brevity.

Generally, a zeolite, calcined zeolite, zeolite-binder, calcined zeolite-binder, can be combined with such promoter precursor in any suitable weight ratios which would result in the weight ratios of a promoter to a zeolite disclosed in the first embodiment of the invention. The combination can be carried out by any means known to one skilled in the art. For example, a metal compound can be physically mixed or blended with a zeolite by stirring, extrusion, blending, kneading, or combinations of two or more thereof. Also for example, a metal compound can be combined with a zeolite by extrusion or impregnation. Presently it is preferred that such combination of zeolite and metal compound be carried out by physical mixing or in a suitable liquid, preferably an aqueous medium, to form an incipient wetness zeolite-precursor mixture or a modified zeolite. The combinations can be carried out at about 10° C. to about 120° C. for about 5 minutes to about 20 hours. The quantity of a metal compound required is the quantity that can produce the composition disclosed in the first embodiment of the invention.

Thereafter, the modified zeolite is contacted with an aliphatic or aromatic hydrocarbon under a condition sufficient to incorporate carbon into the modified zeolite. Generally any aliphatic hydrocarbon, straight- or branch-chained, can be used. Similarly, any aromatic hydrocarbons, non-substituted or substituted, can also be used. However, it is preferred that the hydrocarbon has 1 to about 20, preferably about 1 to about 15, and most preferably 1 to 10 carbon atoms per molecule. Examples of suitable hydrocarbon include, but are not limited to, methane, ethane, propane, butanes, isobutane, pentanes, hexanes, heptanes, octanes, nonanes, benzene, toluene, or combinations of two or more thereof. The contacting condition can include a temperature in the range of from about 150° C. to about 1,000° C., preferably about 200° C. to about 800° C., and most preferably 275° C. to 750° C., under a pressure that can accommodate these temperature ranges, and for about 1 to about 20, preferably about 2 to about 15, and most preferably 3 to 10 hours. Preferably the contacting is carried out in the presence of a gas that is inert to the contacting of the modified zeolite and hydrocarbon, such as hydrogen, helium, argon, nitrogen, and combinations of two or more thereof. The presently preferred inert gas is hydrogen at a flow of about 0.1 to about 10,000, preferably about 1 to 1,000 g of hydrogen per g of the modified zeolite. In this step, a carbon-modified zeolite is produced. The quantity of hydrocarbon required is the quantity that can result in the composition disclosed in the first embodiment of the invention. The quantity of carbon incorporated can be determined by any means known to one skilled in the art such as, for example, thermal gravimetric analysis.

For the production of a metal nitride-incorporated zeolite or a zeolite having incorporated therein a nitrogen-modified metal, the process disclosed immediately above is employed except that the hydrocarbon is replaced with ammonia gas.

In the next step of the process, the carbon- or nitrogen-modified zeolite is subject to thermal treatment, in hot air or steam, under a condition that can include a temperature in the range of from about 300° C. to about 1000° C., preferably about 350° C. to about 900° C., and most preferably 400° C. to 750° C. under a pressure that can accommodate the temperatures and is generally in the range of from about 1 to about 10, preferably about 1, atmospheres for a period in the range of from about 1 to about 30, preferably about 1 to about 20, and most preferably 1 to 15 hours. Upon completion of incorporating or impregnating the carbon into the zeolite by thermal treatment, a promoted zeolite is formed.

The composition of the invention then can be, if desired, pretreated with a reducing agent before being used in a hydrocarbon hydrotreating process. The presently preferred reducing agent is a hydrogen-containing fluid which comprises molecular hydrogen ($H_2$) in the range of from 1 to about 100, preferably about 5 to about 100, and most preferably 10 to 100 volume %. The reduction can be carried out at a temperature, in the range of from about 250° C. to about 800° C. for about 0.1 to about 10 hours preferably about 300° C. to about 700° C. for about 0.5 to about 7 hours, and most preferably 350° C. to 650° C. for 1 to 5 hours.

According to the third embodiment of the present invention, a process comprises, consists essentially of, or consists of contacting a fluid stream with a catalyst composition, optionally in the presence of an inert gas which is preferably a hydrogen-containing fluid, under a condition sufficient to effect the reduction of sulfur content, nitrogen content, or both wherein said fluid stream comprises a hydrocarbon or hydrocarbon mixture which comprises at least one saturated hydrocarbon and can further comprise paraffins, olefins, naphthas, naphthenes, or combinations of two or more thereof. The catalyst composition is the same as that disclosed in the first embodiment of the invention which can be prepared by the second embodiment of the invention. The process is also preferably carried out under a condition that can substantially retain the octane number of the hydrocarbon being hydrotreated.

The term "fluid" is used herein to denote gas, liquid, vapor, or combinations thereof. Any fluid which contains a saturated hydrocarbon can be used in the process of this invention. Generally, the fluid stream can also contain olefins, naphthenes (cycloalkanes), or some aromatic compounds. Examples of suitable, available fluid feeds include, but are not limited to, catalytically cracked gasolines, pyrolysis gasolines from thermal cracking of saturated hydrocarbons, coker naphthas produced by the coking of residual charge stocks, naphthas, gas oils, reformates, fuel oils, and combinations of two or more thereof. The origin of the fluid feed is not critical. Though particular composition of a feed is not critical, a preferred fluid feed is derived from the lights fraction in the product stream of an aromatization process of gasolines such as ethane, propanes, butanes, pentanes, or combinations of two or more thereof.

The fluid feed stream also comprises sulfur compounds, generally in the range of about 0.0001 weight % to about as high as 1 weight % or even about 2 weight %, preferably about 0.001 weight % to about 0.5 weight %. Examples of sulfur compounds include, but are not limited to, hydrogen sulfide, carbon sulfide, carbon disulfide, organic sulfides, organic disulfides, organic trisulfides, organic polysulfides, mercaptans, thiophenes, and combinations of two or more thereof.

Any hydrogen-containing fluid which comprises, consists essentially of, or consists of, molecular hydrogen ($H_2$) can be used in the process of this invention. This hydrogen-containing fluid can contain $H_2$ in the range of from about 1 to about 100, preferably about 5 to about 100, and most preferably 10 to 100 volume %. If the $H_2$ content in the fluid is less than 100%, the remainder of the fluid may be any inert gas such as, for example, $N_2$, He, Ne, Ar, steam, or combinations of two or more thereof, or any other fluid which does not significantly affect the process or the catalyst composition used therein.

The contacting of a fluid feed stream containing a hydrocarbon with the catalyst composition can be carried out in any technically suitable manner, in a batch or semicontinuous or continuous process, under a condition effective to hydrotreat a hydrocarbon. Generally, a fluid stream as disclosed above, preferably being in the vaporized state, is introduced into a suitable hydroprocessing reactor having a fixed catalyst bed, or a moving catalyst bed, or a fluidized catalyst bed, or combinations of two or more thereof by any means known to one skilled in the art such as, for example, pressure, meter pump, and other similar means. Because a hydroprocessing reactor and process therewith are well known to one skilled in the art, the description of which is omitted herein for the interest of brevity. The condition of the process of the invention can include a weight hourly space velocity of the fluid feed stream in the range of about 0.01 to about 100, preferably about 0.05 to about 50, and most preferably 0.1 to 30 g feed/g catalyst/hour. The hydrogen-containing fluid (gas) hourly space velocity generally is in the range of about 1 to about 10,000, preferably about 5 to about 7,000, and most preferably 10 to 10,000 ft$^3$ $H_2$/ft$^3$ catalyst/hour. Generally, the pressure can be in the range of from about 0 to about 2000 psig, preferably about 0 to about 1000 psig, and most preferably 0 to 750 psig, and the temperature is about 150 to about 1000° C., preferably about 200 to about 750° C., and most preferably 250 to 700° C.

The process effluent generally has reduced sulfur content, reduced nitrogen content, or both and has substantially the same octane number as the feed stream. The process effluent can be recovered and processed by any means known to one skilled in the art.

After the catalyst composition has been deactivated by, for example, coke deposition or feed poisons, to an extent that the sulfur reduction, or nitrogen reduction, or octane number retention has become unsatisfactory, the catalyst composition can be reactivated by any means known to one skilled in the art such as, for example, calcining in air to burn off deposited coke and other carbonaceous materials, such as oligomers or polymers, preferably at a temperature of about 400 to about 1000° C. The optimal time periods of the calcining depend generally on the types and amounts of deactivating deposits on the catalyst composition and on the calcination temperatures. These optimal time periods can easily be determined by those possessing ordinary skills in the art and are omitted herein for the interest of brevity.

The following examples are presented to further illustrate this invention and are not to be construed as unduly limiting the scope of the present invention.

EXAMPLE I

This example illustrates the preparation of several hydrotreating catalysts comprising ZSM-5 zeolite.

A ZSM-5 zeolite having a product designation of MFI was obtained from UOP, Des Plaines, Ill. 50 g of the zeolite was well-mixed with 50 g of LUDOX® AS-40 (a colloidal silica obtained from DuPont, Wilmington, Del.) to produce a mixture. The mixture was extruded to ¹⁄₁₆ inch extrudates which were then calcined in air at 538° C. for 6 hours to produce 67.16 g of silica-bound ZSM-5 (catalyst A) containing 30 weight % silica.

Catalyst B was a molybdenum-promoted ZSM-5 catalyst which was prepared as follows. A quantity of 6 grams of the silica-bound ZSM-5 was impregnated with 3.15 grams of an aqueous solution containing 20 weight % $(NH_4)_6Mo_7O_{24} \cdot 4H_2O$. The molybdate-impregnated material was dried at 25° C. for 6 hours and calcined in air at 538° C. for 6 hours to produce 6.28 g of catalyst B (Mo-promoted ZSM-5). Catalyst B contained 5.451 weight % Mo.

Catalyst C was a carburized Mo-promoted ZSM-5 catalyst which was prepared by heating Catalyst B in a gas mixture of methane (flow rate: 100 ml/minute) and hydrogen (flow rate: 400 ml/minute) at 700° C. for 6 hours. Catalyst C (carburized Mo-promoted ZSM-5).

A portion (7.5 g) of the silica-bound ZSM-5 was ion-exchange with a 10 weight % $Cu(NO_3)_2 \cdot 2.5H_2O$ solution (50 g) at 90° C. for 15 hours to produce a Cu-incorporated ZSM-5. The Cu-incorporated ZSM-5 was washed 5 times each with 2,000 ml of water and dried at 25° C. for 6 hours followed by calcination at 538° C. for 6 hours to produce 7.47 g of Cu-promoted ZSM-5. The Cu-promoted ZSM-5 was further impregnated with 3.91 g of 20 weight % $(NH_4)_6Mo_7O_{24} \cdot 4H_2O$ followed by air calcination of the resulting impregnated product at 538° C. for 6 hours to produce 8.01 g of Mo/Cu-promoted ZSM-5 (catalyst D) which contained 5.305 weight % Mo. A portion (4.70 g) of catalyst D was further heated in a gas mixture of methane (100 ml/minute) and hydrogen (400 ml/minute) for 6 hours at 700° C. to produce 4.62 g of carburized Mo/Cu-promoted ZSM-5 (catalyst E).

The ZSM-5 obtained from UOP, as described above, was calcined at 538° C. for 2 hours to produce a calcined ZSM-5 powder. A portion (33 g) of the calcined ZSM-5 powder was mixed with 66 g of 10 weight % tetraethoxysilane (TEOS) in cyclohexane and then dried by evaporating TEOS in a dry box at about 25° C. (room temperature) for 16 hours and to silylate the zeolite. The silylation took place at 85° C. for 3 hours. The resultant zeolite was calcined at 538° C. for 6 hours followed by mixing with 33 g of LUDOX® AS-40 to produce a silica-bound silylated ZSM-5. After being extruded to 1/16 inch extrudates, the silica-bound silylated ZSM-5 was again calcined at 538° C. for 6 hours to produce 45.61 g catalyst EE.

A portion (6 g) of catalyst EE was impregnated with 2.96 g of 20 weight % $(NH_4)_6Mo_7O_{24} \cdot 4H_2O$ followed by air calcination at 538° C. for 6 hours to produce 6.21 g of a Mo-promoted silylated ZSM-5 which was further treated with a gas mixture of methane (100 ml/minute) and hydrogen (400 ml/minute) at 700° C. for 6 hours to produce 6.04 g of carburized Mo-promoted silylated ZSM-5 (catalyst F). Catalyst F contained 5.180 weight % Mo.

Another portion (18.24 g) of catalyst EE was further impregnated with 6.67 g of 10 weight % TEOS in cyclohexane followed by air calcination at 538° C. for 6 hours to produce 17.99 g of TEOS-treated silylated ZSM-5. Of the 17.99 g, 6 g was then impregnated with 3.30 g of 20 weight % $(NH_4)_6Mo_7O_{24} \cdot 4H_2O$ followed by air calcination at 538° C. to produce 6.42 g of Mo-promoted, twice silylated ZSM-5. The Mo-promoted, twice silylated ZSM-5 was further treated with a gas mixture of methane (100 ml/minute) and hydrogen (400 ml/minute) at 700° C. for 6 hours to produce 6.31 g of Mo-promoted, twice silylated ZSM-5 (catalyst G) which contained 5.586 weight % Mo.

In a separate run, 7.09 g of catalyst A was heated in a U-shape tube with steam at 650° C. for 6 hours to produce 6.94 g of steamed ZSM-5. The steamed ZSM-5 was then impregnated with 3.83 g of 20 weight % $(NH_4)_6Mo_7O_{24} \cdot 4H_2O$ aqueous solution followed by air calcination at 538° C. for 6 hours to produce 7.46 g of Mo-promoted steamed ZSM-5 (catalyst H) which contained 5.58 weight % Mo.

A portion (4.37 g) of catalyst H was further treated with a gas mixture of methane (100 ml/minute) and hydrogen (400 ml/minute) at 700° C. for 6 hours to produce 4.26 g of carburized, Mo-promoted steamed ZSM-5 (catalyst I).

The following catalysts were produced using a ZSM-5 zeolite obtained from UCI (United Catalysts, Inc., Louisville, Ky.) having a product designation of T-4480. The T-4480 zeolite was obtained in 1/16 extrudate forms and was alumina-bound (about 30 weight % alumina) (catalyst J).

A portion (13.07 g) of catalyst J was impregnated with 7.22 g of 20 weight % $(NH_4)_6Mo_7O_{24} \cdot 4H_2O$ aqueous solution followed by air calcination at 538° C. for 6 hours to produce 13.21 g of Mo-promoted ZSM-5 (catalyst K) which contained 5.94 weight % Mo.

A portion (9.99 g) of catalyst K was further treated with a gas mixture of methane (100 ml/minute) and hydrogen (400 ml/minute) at 700° C. for 6 hours to produce 9.73 g of carburized, Mo-promoted ZSM-5 (catalyst L).

In another preparation, 25.85 g of catalyst J was impregnated with 14.21 g of 20 weight % $(NH_4)_4H_2W_{12}O_{40}$ aqueous solution followed by air calcination to produce 26.30 g of W-promoted ZSM-5 (catalyst M) which contained 8.064 weight % tungsten.

Catalyst M was further treated with a gas mixture of methane (100 ml/minute) and hydrogen (400 ml/minute) at 750° C. for 6 hours to produce 25.89 g of catalyst N was carburized, W-promoted ZSM-5.

Another portion (17.65 g) of catalyst J was impregnated with 10.16 g of 20 weight % $(NH_4)_4H_2W_{12}O_{40}$ solution to produce a W-impregnated ZSM-5. The W-impregnated ZSM-5 dried at 120° C. in air for 16 hours and then was further treated with a gas mixture of methane (100 ml/minute) and hydrogen (400 ml/minute) at 750° C. for 6 hours to produce 17.88 g of carburized W-promoted ZSM-5 (catalyst 0). Catalyst 0 contained 8.481 weight % W.

In a further preparation, 46.02 g of catalyst J was impregnated with 31.7 g of 20 weight % $(NH_4)_4H_2W_{12}O_{40}$ solution followed by air calcination at 538° C. for 6 hours to produce 47.73 g of W-impregnated ZSM-5. Of this 47.73 g, 23.01 g was heated with a gas mixture of methane (150 ml/min) and hydrogen (600 ml/min). The heating was carried out at an initial temperature of 400° C. ramping at 1° C./minute to 750° C. and then at 750° C. for 2 hours. A carburized W-promoted ZSM-5 (catalyst P; 22.57 g) was produced. This catalyst (catalyst P) was labeled as produced by TPC (temperature programmed carburization). Catalyst P contained 9.912 weight % W.

A portion (26.57 g) of catalyst J was also impregnated with 15.24 g of an aqueous solution containing 20 weight % $(NH_4)_6Mo_7O_{24} \cdot 4H_2O$ and 16 weight % $Zn(NO_3)_2 \cdot 6H_2O$. The resultant Zn/Mo-impregnated ZSM-5 was calcined at 538 ° C. for 6 hours to produce 27.72 g of Zn/Mo-promoted ZSM-5 (catalyst Q), of which 12.0 g was further treated with a gas mixture of methane (150 ml/minute) and hydrogen (600 ml/minute) at 700° C. for 6 hours to produce 11.47 g of a carburized, Zn/Mo-promoted ZSM-5 (catalyst R). Both catalysts Q and R contained about 5.975 weight % Mo and 1.934 weight % Zn.

In a separate run, 20 g of T-4480 zeolite was ion exchanged with an aqueous solution containing 2 g of silver nitrate and 300 g of 1N ammonium nitrate at 90° C. for 66 hours. After being washed and dried, the Ag-incorporated zeolite was calcined at 538° C. for 6 hours in air to produce 9.34 g of calcined, Ag-incorporated zeolite. The calcined Ag-incorporated zeolite was then impregnated with 7.18 g of 20 weight % ammonium heptamolybdate solution followed by calcination for 6 hours at 538° C. to produce 10.46 g of a Ag/Mo-impregnated zeolite (catalyst S). Of this 10.46 g, 6.83 g was treated with a methane-hydrogen mixture at 750° C. for 6 hours in which the methane flow was 100 ml/min and the hydrogen flow was 400 ml/min to produce 6.70 g of a carburized zeolite (catalyst T).

EXAMPLE II

This example illustrates the use of the above-described catalysts in the aromatization of gasoline.

A stainless steel reactor tube (inner diameter: 2.5 cm; length: 60 cm) was filled with a 20 ml bottom layer of Alundum® alumina (inert, low surface alumina, Norton Company, Worcester, Massachusetts), 3.1 to 3.4 grams of one of the catalysts of Example I in the middle, and 20 ml top layer of Alundum® alumina. The reactor was heated to a reaction temperature of about 365° C. to about 370° C. The feed was a catalytically cracked gasoline (CCG) obtained from a Phillips Petroleum Company refinery and was introduced at a rate of about 20 ml/hour (equivalent to a weight hourly space velocity of 4.5–4.8 g/g catalyst/hour), together with hydrogen gas at a rate of 15.61l/hour. The reaction pressure was about 500 psig.

The reactor effluent was cooled and separated into a gaseous phase and a liquid phase by passing it through a wet ice trap for liquid product collection and then through a wet test meter for gas volume measurement. The liquid was weighed hourly and analyzed on a Hewlett-Packard 5890 gas chromatograph equipped with a fused silica column (DB-1). The gas was sampled hourly and analyzed on a Hewlett-Packard 5890 gas chromatograph using a HP-PLOT/Al$_2$O$_3$ column. The gas was also analyzed for hydrogen content on a Carle gas chromatograph using a hydrocarbon trap followed by a 13X molecular sieve column. Pertinent test results after run times of about 5–7 hours are summarized in Table I.

In Table I below, C$_5$+ yield denotes total hydrocarbon molecules having 5 or more carbon atoms; S and N refer to parts per million by weight of sulfur and nitrogen, respectively; the nitrogen detection limit was 10 ppm and <10 pm refers to lower than detection limit; Bz is benzene; and RON refers to research octane number. The composition of the feed, CCG, is given at the bottom of Table I.

TABLE I

| Catalyst | C$_5$ + yield (wt %) | S (ppmw) | N (ppmw) | Olefins (wt %) | Bz (wt %) | RON |
|---|---|---|---|---|---|---|
| B | 56.3 | 47.0 | <10 | 3.8 | 2.41 | 94.27 |
| C | 51.2 | 33.0 | <10 | 1.7 | 3.39 | 95.49 |
| D | 64.0 | 23.0 | <10 | 4.2 | 2.13 | 92.58 |
| E | 69.9 | 12.3 | <10 | 4.1 | 1.98 | 92.55 |
| F | 67.0 | 23.0 | <10 | 4.1 | 1.93 | 89.55 |
| G | 79.0 | 22.0 | <10 | 6.5 | 1.51 | 89.13 |
| H | 86.7 | 74.0 | <10 | 8.4 | 1.23 | 86.64 |
| I | 78.2 | 19.0 | <10 | 4.8 | 1.24 | 89.32 |
| K | 60.9 | 4.2 | | 0.4 | 2.81 | 96.82 |
| L | 41.3 | 23.0 | | 0.3 | 3.51 | 99.61 |
| M | 44.7 | 130.0 | 22.0 | 0.5 | 2.40 | 98.91 |
| N | 70.5 | 27.0 | <10 | 1.2 | 1.75 | 91.42 |
| O | 68.5 | 10.0 | | 1.3 | 1.68 | 90.00 |
| P | 75.5 | 15.0 | <10 | | | |
| Q | 48.5 | 15.0 | | 0.4 | 3.40 | 94.80 |
| R | 72.2 | 2.0 | | 1.0 | 1.06 | 93.93 |
| S | 79.7 | 173.0 | 24.0 | 2.9 | 1.59 | 92.84 |
| T | 84.1 | 9.0 | 40 | 0.9 | 2.04 | 93.26 |
| CCG | | 210.0 | 46.0 | 27.0 | 1.22 | 89.20 |

Test data in Table I clearly show the advantages of the carburized ZSM-5 catalysts of this invention (catalysts C, E, F, G, I, L, N, O, P, R, and T) over uncarburized ZSM-5 catalysts (A, B, D, H, K, M, Q, and S): lower undesirable sulfur and nitrogen contents; higher desirable products, C$_5$+ hydrocarbons; and no decrease in octane number.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process for producing a catalytic zeolite composition comprising metal carbide or metal nitride with the process consisting essentially of
    (1) contacting a ZSM-5 zeolite with at least one metal compound selected from the group consisting of zinc compounds, silver compounds, copper compounds, molybdenum compounds, lanthanum compounds, tungsten compounds, chromium compounds, iron compounds, ruthenium compounds, manganese compounds, rhenium compounds, cobalt compounds, rhodium compounds, iridium compounds, nickel compounds, palladium compounds, platinum compounds, hafnium compounds, and combinations of two or more thereof under conditions that impregnate or exchange said metal compound into said zeolite thereby forming a modified zeolite;
    (2) calcining said modified zeolite at a temperature in a range above about 300° C. thereby producing a calcined modified zeolite; and
    (3) contacting said calcined modified zeolite with a hydrocarbon under conditions to convert the metal to a metal carbide thereby producing a catalytic zeolite composition comprising metal carbide or with ammonia under conditions to convert the metal to a metal nitride thereby producing a catalytic zeolite composition comprising metal nitride.

2. A process according to claim 1 wherein said calcined modified zeolite is contacted with a hydrocarbon under conditions to convert the metal to a metal carbide thereby producing a catalytic zeolite composition comprising metal carbide.

3. A process according to claim 2 wherein said metal compound is selected from the group consisting of zinc compounds, silver compounds, copper compounds, molybdenum compounds, tungsten compounds, and combinations of two or more thereof.

4. A process according to claim 3 wherein the contacting in step (3) is carried out in the presence of hydrogen.

5. A process according to claim 4 wherein said metal compound is ammonium tungstate.

6. A process according to claim 4 wherein said metal compound comprises ammonium heptamolybdate.

7. A process according to claim 6 wherein said metal compound further comprises a metal compound selected from the group consisting of copper nitrate, silver nitrate, zinc nitrate, and combinations of two or more thereof.

8. A process according to claim 1 wherein said calcined modified zeolite is contacted with ammonia under conditions to convert the metal to a metal nitride thereby producing a catalytic zeolite composition comprising metal nitride.

9. A process according to claim 8 wherein said metal compound is selected from the group consisting of zinc compounds, silver compounds, copper compounds, molybdenum compounds, tungsten compounds, and combinations of two or more thereof.

10. A process according to claim 9 wherein the contacting of step (3) is carried out in the presence of hydrogen.

11. A process according to claim 10 wherein said metal compound is ammonium tungstate.

12. A process according to claim 10 wherein said metal compound is ammonium heptamolybdate.

13. A process according to claim 12 wherein said metal compound further comprises a metal compound selected from the group consisting of copper nitrate, silver nitrate, zinc nitrate, and combinations of two or more thereof.

* * * * *